United States Patent [19]

Shibata et al.

[11] Patent Number: 4,507,352

[45] Date of Patent: Mar. 26, 1985

[54] OVERWRAPPING FILM

[75] Inventors: Katsuhiko Shibata, Miyagi; Mitsuyoshi Sato, Sendai, both of Japan

[73] Assignee: Sony Corporation, Tokyo, Japan

[21] Appl. No.: 410,971

[22] Filed: Aug. 24, 1982

[30] Foreign Application Priority Data

Oct. 15, 1981 [JP] Japan ............................ 56-164569

[51] Int. Cl.$^3$ ............................ B44F 1/00; B32B 7/06

[52] U.S. Cl. ............................ 428/201; 428/209; 428/199

[58] Field of Search ............... 428/195, 201, 209, 199, 428/203, 207

[56] References Cited

U.S. PATENT DOCUMENTS 3,003,892 10/1961 Shannon ............................ 428/195
3,081,571 3/1963 Dayen et al. ................... 428/195 X
3,463,651 8/1969 Warsager ............................ 428/209
3,494,818 2/1970 Marchese ........................ 428/203 X
3,725,184 4/1973 Scopp ................................ 428/203
3,912,842 10/1975 Swartz ............................ 428/207 X

*Primary Examiner*—George F. Lesmes
*Assistant Examiner*—Nancy A. B. Swisher
*Attorney, Agent, or Firm*—Lewis H. Eslinger; Alvin Sinderbrand

[57] ABSTRACT

An overwrapping film wherein a plastic base film is coated with a plastic material to form an anchor coat layer, which is, in turn, further coated with ink to form an ink layer thereon, and a metal layer is then deposited on the ink layer through the process of vacuum evaporation. The plastic base film is thermally contracted to produce a tightly-packed configuration, while the evaporated metal layer furnishes a metallic gloss to a printed display pattern provided by the ink layer.

5 Claims, 6 Drawing Figures

OVERWRAPPING FILM

BACKGROUND OF THE INVENTION

1. Field of the Invention

This invention relates to an overwrapping film using a plastic base film and a method of producing the same.

2. Description of the Prior Art

Tape cassettes commercially available for use in cassette tape recorders or the like are sold at stores and are typically packed with an overwrapping film which employs a plastic base film. In order to ensure easy visual distinction from other merchandise, the overwrapping film generally has a printed display region to show a trade name and other data which, for example, could represent the audio characteristics of the particular cassette. The overwrapping film for articles exhibited and sold in stores should be finished and in a satisfactory condition for enhancing the image of the merchandise contained therein since the appearance thereof usually exerts a great influence on the buyer. Typical materials adapted to produce overwrapping films for tape cassettes include transparent synthetic resins or plastics such as polypropylene.

A display region is formed on each film by printing with a variety of paints so as to attain a favorable esthetic effect to the overall design. Furthermore, by utilizing the thermal contraction property of the plastic material, a tightly-packed configuration is obtained with the contraction of the overwrapping film subsequent to packing.

In attaining an adequate fit of the overwrapping film through such a thermal contraction treatment, there also exists the possibility of deformation of the printed display region occurring on the overwrapping film during, and as a result of, the thermal contraction treatment. Particularly, when a finished appearance is to be achieved by furnishing a metallic gloss to the printed display region, the harmful effects derived from such thermal contraction can be considerable. According to a solution taught by the prior art, hot stamping is executed for setting a metallic gloss to a cassette-tape overwrapping film. However, some problems inherent in this method include deviation of the stamping position due to a post-treatment, restriction on the stamping area, deterioration of the gloss resulting from finishing thermal contraction, difficulties in producing a continuous supply of products with satisfactory overwrapping, and an increase in the production cost.

SUMMARY OF THE INVENTION

In an attempt to eliminate the problems mentioned above, the present invention provides a new overwrapping film which is adapted to attain a tightly packed configuration by utilizing the thermal contraction property of a plastic base film. The overwrapping film according to the present invention comprises a plastic base film, an anchor coat layer formed by coating the the base film with a plastic material in a desired pattern, an ink layer of a desired pattern formed on the anchor coat layer, and an evaporated metal layer subsequently deposited on the ink layer in such a manner as to correspond in overall configuration to the anchor coat layer. On the plastic base film, then is formed a display pattern of the ink layer which is furnished with a metallic gloss by the evaporated metal layer. The plastic film base can be thermally contracted, and the evaporated metal layer sets the metallic gloss to the printed display pattern.

OBJECTS OF THE INVENTION

A primary object of the present invention is to provide an overwrapping film capable of achieving a tightly-packed configuration.

Another object of the invention is to provide an overwrapping film having a printed display pattern with a metallic gloss.

Still, another object of the present invention is to provide an overwrapping film where a printed display pattern thereof is rendered free from gloss deterioration or deformation despite a subsequent thermal contraction treatment.

A further object of the present invention is to provide a method of producing an overwrapping film which has an improved display pattern which is rendered free from gloss deterioration despite a thermal contraction treatment.

BRIEF DESCRIPTION OF THE DRAWINGS

FIGS. 4(A) through (E) illustrate the steps of producing the overwrapping film, in which (A) is a rear view of a base film covered with an anchor coat layer, (B) is a rear view of the film which an ink layer, (C) is a rear view of the film with a water-color ink layer, (D) is a sectional view of the film with an evaporated metal layer, and (E) is a sectional view of the film after a rinsing step; and FIG. 5 is a perspective exterior view of a roll of the overwrapping film produced through the above-mentioned steps.

DESCRIPTION OF THE PREFERRED EMBODIMENT

Figure 1:
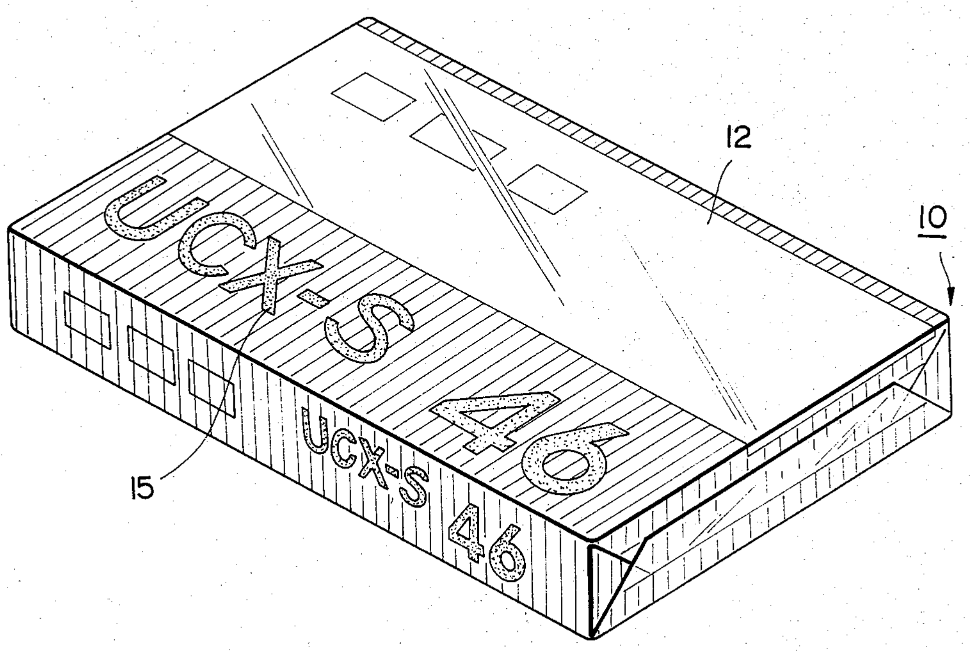
FIG. 1 is a perspective exterior view of a tape cassette packed with an overwrapping film according to the teaching of the present invention.
Figure 2:
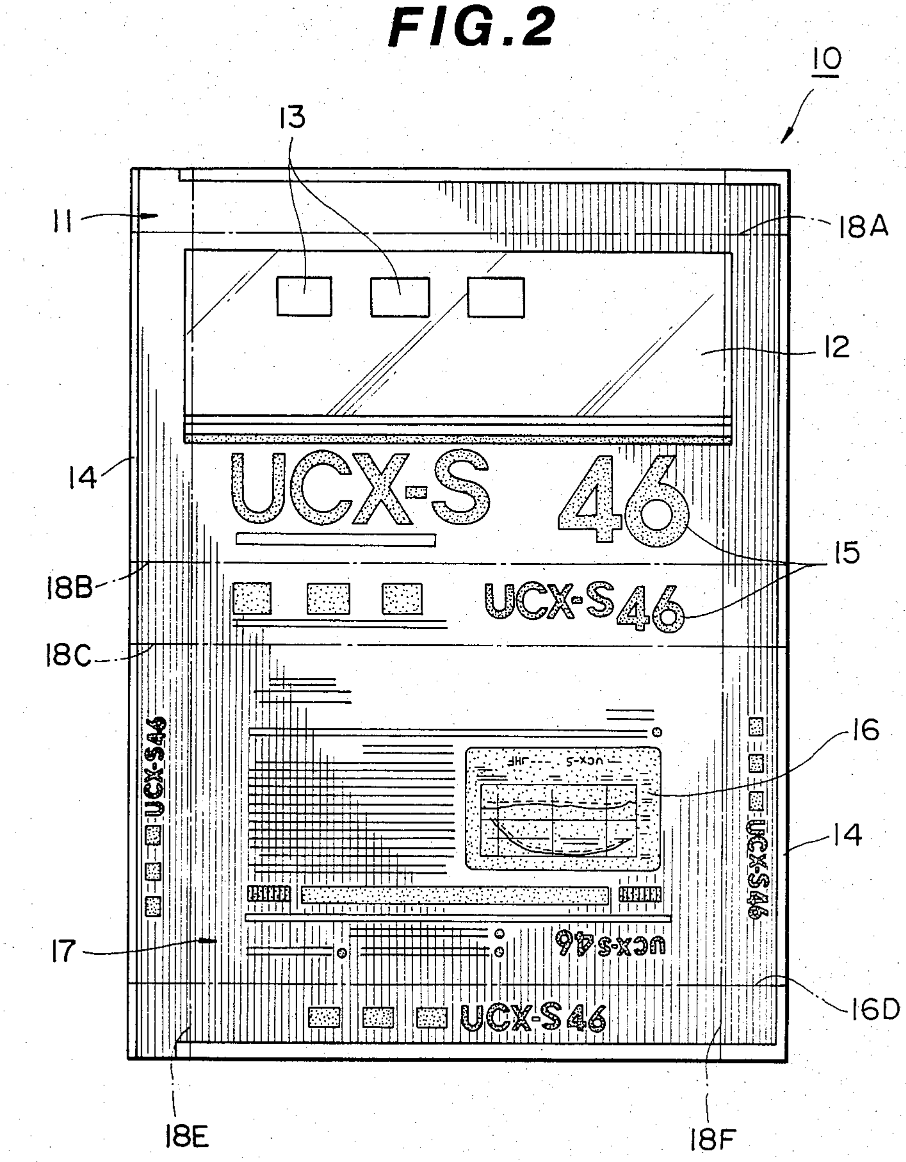
FIG. 2 is a plan view of the overwrapping film of FIG. 1 unfolded and seen from its opposite side.

In an overwrapping film 10 used for packing a tape cassette as illustrated in FIG. 1, a printed display region of a desired pattern as shown in an unfolded view of FIG. 2 is formed, by the process to be described below, on the film base 11 composed of a transparent plastic material such as polypropylene and having a specific, and known thermal coefficient of contraction. In FIG. 2, a transparent window 12 is formed for permitting visual recognition of an overwrapped object or a tape cassette, and characters representationally shown at 13 represent the name of a maker or other information and can be printed on the transparent window 12 with non-transparent black ink. A transparent heat seal portion 14 to be sealed by heat at the overwrapping time is formed along the peripheral edge of the overwrapping film 10 in a length corresponding to one tape cassette. Characters 15 can represent the type of the tape cassette to be overwrapped and can be displayed in silver which is the base color of an evaporated metal layer 25 deposited after the vacuum evaporation of aluminum. A data display region 16 can indicate necessary data and can be, for example, printed with black ink on a silver base. With the exception of the said transparent window 12, heat seal portion 14, characters 13, 15, and data display region 16, the rest is a nontransparent portion 17 which can, for example, be colored brown and can have a metallic gloss. One-dot chained lines 18A, 18B, 18C, 18D, 18E and 18F are shown in FIG. 2 to merely denote folding lines for overwrapping and are not printed actually on the film 10.

Figure 3:
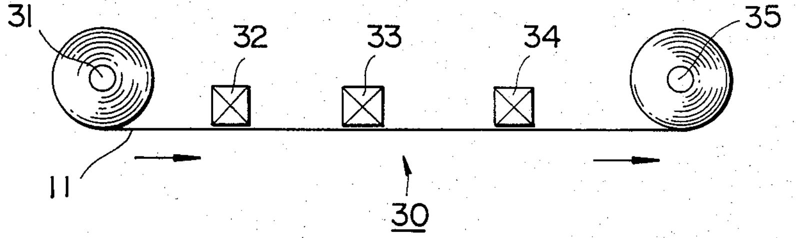
FIG. 3 schematically shows the basic structure of an apparatus adapted for printing the overwrapping film of FIG. 1.
Figure 4A:
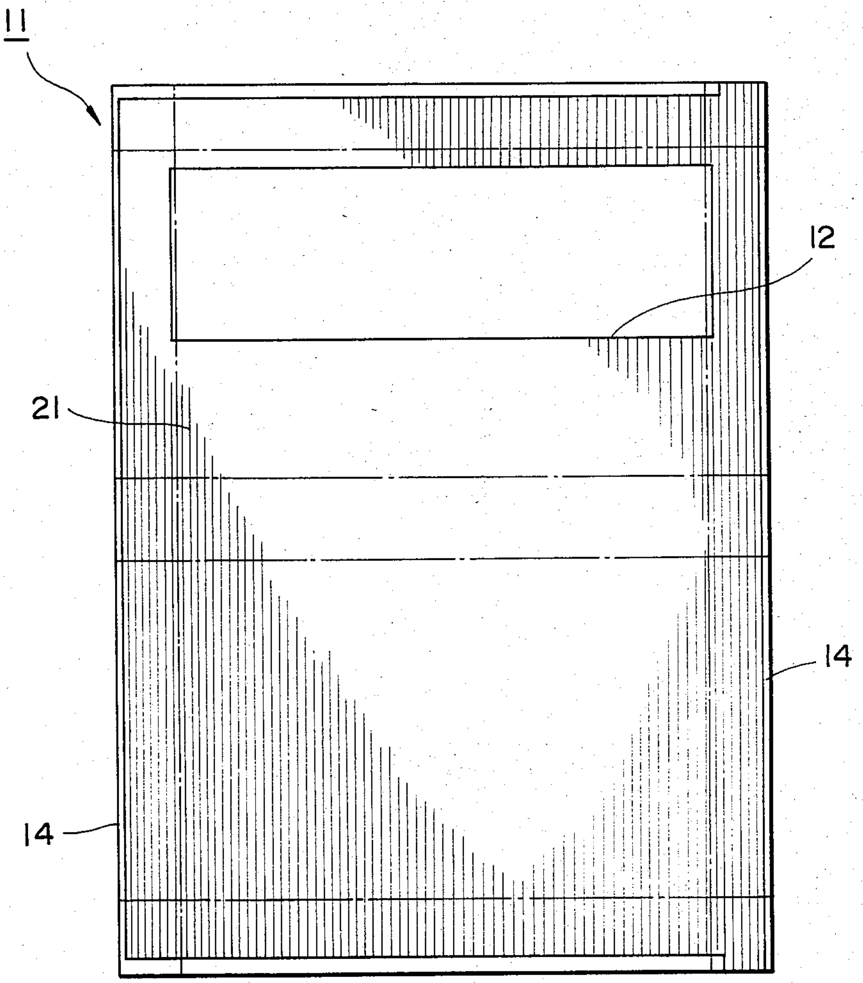
Figure 4B:
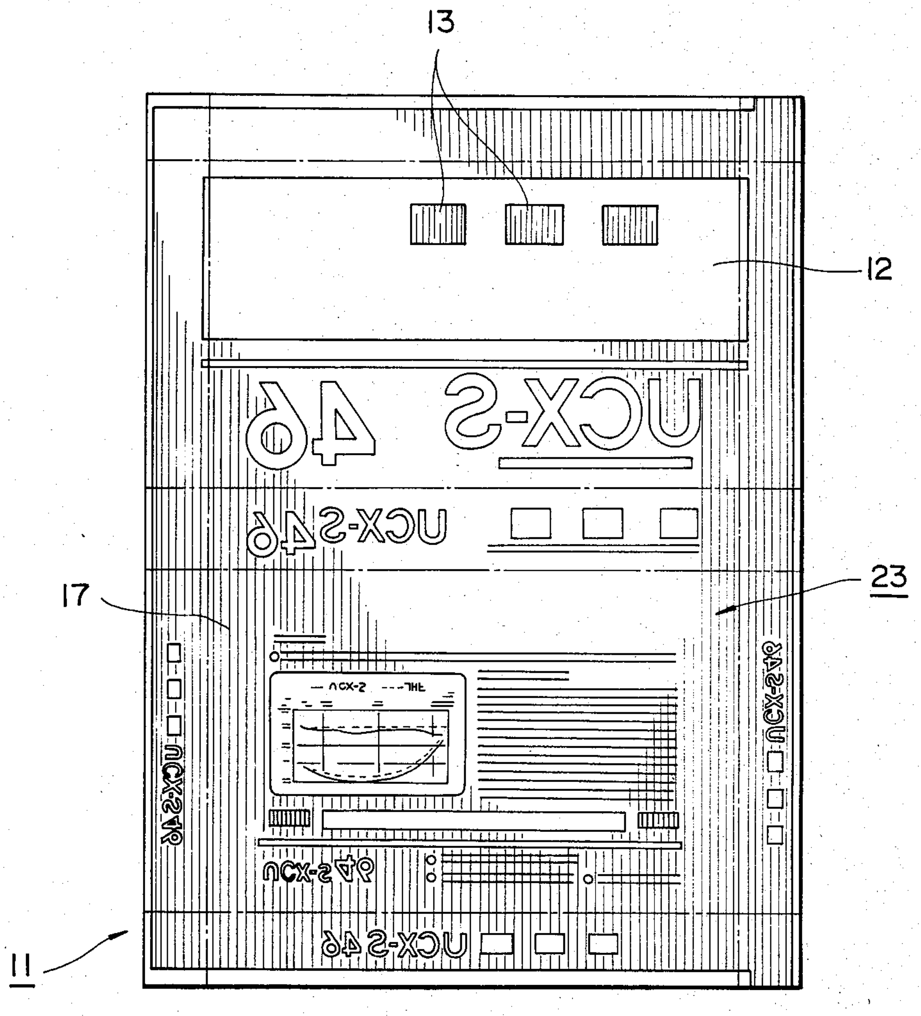
Figure 4C:
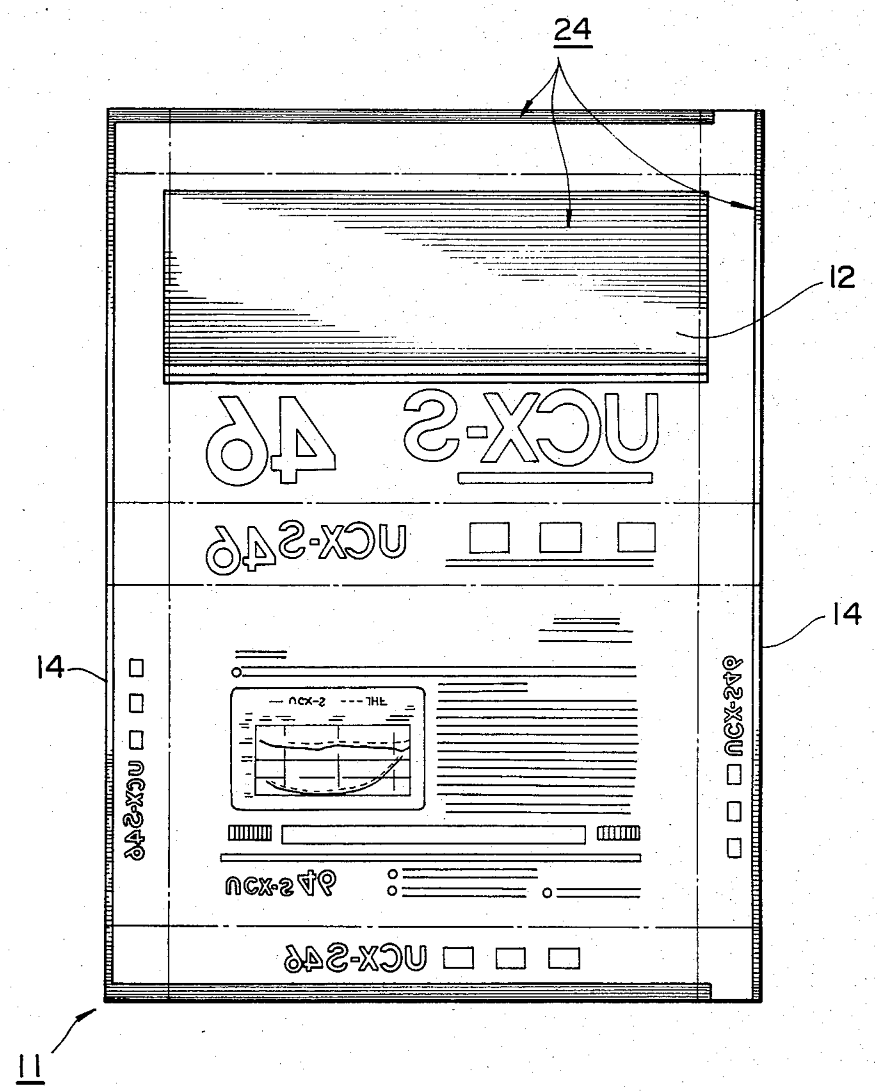

Subsequent to the printing performed by an apparatus 30 as schematically shown in FIG. 3, the overwrapping film 10 is treated by vacuum evaporation and is further rinsed with water so as to be cleansed. That is, in the arrangement of FIG. 3, of the base film 11, preferably made of a resin, particularly polyethylene, is forwarded from a first supply roller 31 and is coated with a plastic material 21 at a first printing block 32, except the areas of the base film 11 which corresponds to the transparent window 12, and the heat seal portion 14 as illustrated in FIG. 4(A), so that an anchor coat layer 21 is formed thereon. Subsequently, after drying the anchor coat layer 21, the characters 13 and, for example, the data display region, are printed with ink in a second printing block 33, and further, the nontransparent part 17 is printed with ink which is preferably brown to form an ink layer 23 as illustrated in FIG. 4(B). In the next step subsequent to the drying of the ink layer 23, the transparent window 12 and the heat seal portion 14 are coated with water-color ink in a third printing block 34 to form a water-color ink layer 24 as illustrated in FIG. 4(C). The film base 11 thus processed through the first, second and third printing blocks 32, 33 and 34 is wound on a second or take-up roller 35 after drying the water-color ink.

In addition to the above printing steps, vacuum evaporation of aluminum is executed on the entire side of the film base 11 to subsequently form an evaporated metal layer 25 as illustrated in FIG. 4(D). Consequently, a substrate composed of the base film, anchor layer, and ink layers is formed. Subsequently, the film base 11 is treated with shower rinsing so that, as illustrated in FIG. 4(E), the evaporated metal layer 25 is removed together with the water-color ink layer 24 formed on the transparent window 12 and the heat seal portion 14, thereby producing the overwrapping film 10 of FIG. 2.

The overwrapping film 10 thus obtained has, on the film base 11, a multiplicity of continuous patterns each corresponding to one tape cassette as illustrated in FIG. 5. After the tape cassette is overwrapped with the film 10 folded along the one-dot chained lines 18A, 18B, 18C, 18D, 18E and 18F, the overlapping heat seal portions 14 are thermally welded to each other by the application of heat at approximately 200° C. for a time of 0.5 seconds. Subsequently, the tape cassette packed with the overwrapping film 10 is heated for about 2 seconds in an atmosphere around 200° C., so that the overwrapping film 10 is thermally contracted to render the overwrapping of the tape cassette adequately tight as illustrated in FIG. 1.

In the overwrapping film 10 thus produced through the steps described hereinabove, the nontransparent part 17 is formed of the brown ink layer 23 with a metallic gloss provided by the evaporated metal layer 25, and the characters 15 and the ground of the data display region 16 are shown in silver by the evaporated metal layer 25, hence presenting a remarkably appealing appearance. Moreover, the evaporated metal layer 25 can be removed with certainty from the transparent window 12 and the heat seal portion 14 in the rinsing step. Furthermore, in the thermal contraction step, which is executed primarily to attain a tightly-fit configuration, the ink layer 23 and the evaporated metal layer 25 formed on the anchor coat layer 21 are substantially free from exfoliation or deformation regardless of the thermal contraction of the film base 11, so that it becomes possible to achieve a satisfactory wrapped configuration of plastic film having a higher deformation yield rate and an overall lower cost of production when compared to the known hot stamping process.

It is also to be noted that, by the provision of a connecting portion 25A to connect the repetitive pattern of the tape cassette as illustrated in FIG. 5, the evaporated metal layer 25 deposited on the reverse side of the film base 11 is utilizable as a grounding path for any static electricity generated during the wrapping of the tape cassette.

From the foregoing, it is apparent that the objects of the present invention have been fully accomplished. As a result of the present invention, a novel process and apparatus for the overwrapping of objects, and particularly, cassettes, has been provided. Although a preferred embodiment of the principles of this invention has been described and illustrated in detail herein, it should be realized that the same are not limited to the particular configuration shown in the drawings, and that modifications thereof are contemplated and can be made without departing from the broad spirit and scope of this invention as defined in the appended claims.

What is claimed is:

1. An overwrapping film comprising:
   - a transparent base film;
   - an anchor coat layer bonded to an underside of said base film, said anchor coat layer comprising a material having a configuration of a first pattern;
   - an ink layer positioned on said anchor coat layer and having a second pattern which is contained within, and occupies only a portion of said first pattern, said ink layer being at least partially visible through said base film and said anchor coat; and
   - a metal layer coextensive with said first pattern and bonded to said ink layer and to portions of said anchor coat layer extending beyond said ink layer, said metal layer imparting a metallic gloss to the ink layer as seen through said base film and anchor coat layer and said metal layer further providing a respective metal color at said portions of the anchor coat layer extending beyond the ink layer.

2. An overwrapping film as defined in claim 1, in which said base film is comprised of a plastic material capable of thermally contracting.

3. An overwrapping film as defined in claim 1 said base film comprising a plastic material.

4. An overwrapping film as defined in claim 3, said base film comprised of polyethylene.

5. An overwrapping film as defined in claim 1, said metal layer comprising a grounding path for static electricity.

* * * * *